United States Patent [19]

Maby et al.

[11] Patent Number: 4,684,049

[45] Date of Patent: Aug. 4, 1987

[54] VERSATILE CARRYING BAR FOR CARS WITH AND WITHOUT GUTTERS

[76] Inventors: Jacques Maby; Jean L. Maby, both of Montfleuri - Petit Parame, 34500 Saint-Malo, France

[21] Appl. No.: 771,773

[22] Filed: Sep. 3, 1985

[30] Foreign Application Priority Data

Sep. 6, 1984 [FR] France .................... 84 13735

[51] Int. Cl.$^4$ ............................................. B60R 9/00
[52] U.S. Cl. ...................................... 224/329; 224/320
[58] Field of Search ............. 224/309, 314, 315, 320, 224/322, 325, 327, 329, 330

[56] References Cited

U.S. PATENT DOCUMENTS

| | | | |
|---|---|---|---|
| 2,888,178 | 5/1959 | Olsen | 224/329 |
| 4,326,655 | 2/1982 | Gradek et al. | 224/324 |

FOREIGN PATENT DOCUMENTS

| | | | |
|---|---|---|---|
| 3004919 | 8/1981 | Fed. Rep. of Germany | 224/320 |
| 789793 | 8/1935 | France | 224/329 |
| 1392322 | 2/1965 | France | 224/329 |

*Primary Examiner*—Stephen Marcus
*Assistant Examiner*—David Voorhees
*Attorney, Agent, or Firm*—Cushman, Darby & Cushman

[57] ABSTRACT

A versatile carrying bar for cars with or without gutters, including an invisible flexible connecting member (4) along the carrying tube and allowing, on one hand, the contour of the roof edge to be clamped by vertical tightening between a movable part (12–17) and a support pad (18) forming the bar feet, and, on the other hand, the bar to be firmly maintained on the roof by horizontally tightening said feet by bringing them near, the whole by means of a lockable tensioning device (11).

10 Claims, 3 Drawing Figures

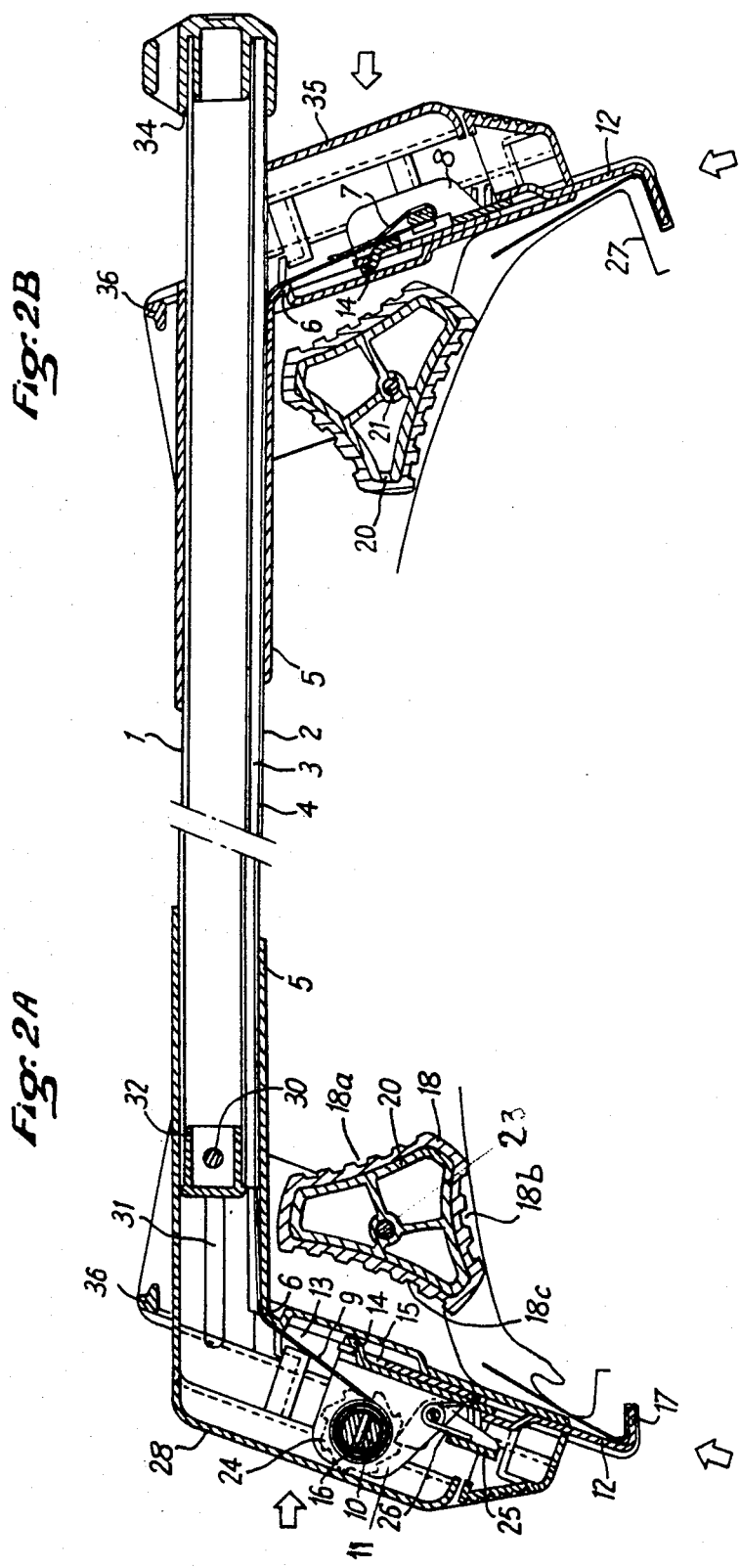

VERSATILE CARRYING BAR FOR CARS WITH AND WITHOUT GUTTERS

BACKGROUND OF THE INVENTION

This invention relates to a new versatile carrying bar which can be mounted on a car roof whether or not it is fitted with a gutter.

Carrying bars are already known for supporting luggage on car roofs. They are always provided with a carrying tube, the ends of which include support feet matingly engaged with the side contours of the roof.

Heretofore, bars are generally classified into bars for roofs including gutters and bars for roofs without gutters.

While roofs equipped with gutters show no problems, it is not so with the increasingly numerous gutter-free roofs, the very different contours of which more often require a specific support foot adapted to the contour of each roof type, thereby multiplying models and increasing commercial and manufacturing difficulties.

The early introduced devices included at each end thereof a support foot provided with a crosshead attached to the carrying tube, equipped with a support pad bearing on the roof and a tab applied against the edge thereof within the gap between the roof and the door top. The whole assembly was tightened by a connecting screw.

Such a device which gave good results with roofs being sufficiently crush-proof is not efficient with the new thin sheet metal roofs free from side reinforcing ribs.

This is why devices have been developed further including, in addition to the above-mentioned systems, a rigid connecting member of the cable or tube type wich is in parallel relationship with the carrying tube and connects the support-feet in order to prevent them from diverging when the roof is compressed.

The disadvantages of such a system are that it practically requires a connecting member for each roof type, even a different one between the fore and the rear parts; apart from the whole assembly being unaesthetic, said connecting member is the source of unpleasant noise due to air whistling when laminated between connecting member and roof.

SUMMARY OF THE INVENTION

One object of the invention is to overcome such disadvantages as it includes a single connecting member, the length of which can be adapted to different roof widths, said member being totally invisible and therefore causing no noise and further ensuring, through a single operation, the vertical tightening of said lugs and the horizontal one of said feet by means of a lockable device.

BRIEF DESCRIPTION OF THE DRAWINGS

Further features and advantages of this invention will be apparent from the following description, given by way of exemple, considered together with the accompanying drawings, wherein:

FIG. 2 is a cross-section view showing a bar, an end of which is disposed on a roof including gutters (FIG. 2A), the other end being placed on a roof without gutter (FIG. 2B).

DETAILED DESCRIPTION OF THE PREFERRED EMBODIMENT

Figure 1:
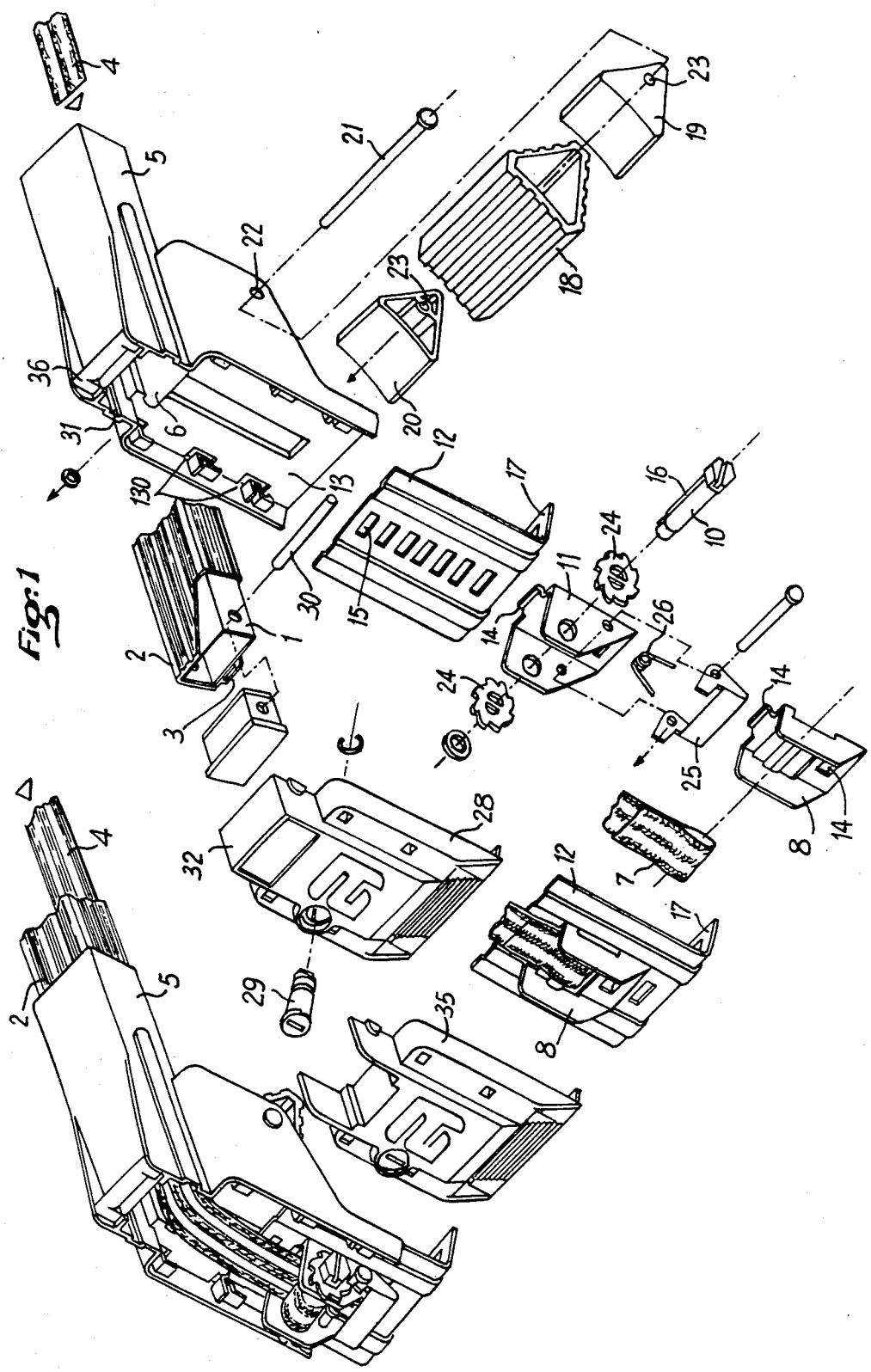
FIG. 1 is an exploded view showing an embodiment of the invention.

Each carrying bar includes a rigid carrying element 1, advantageously in the form of a metal tube or section. This element is covered with a shaped sheath 2 made out of extruded plastics including a housing 3 through which slides a flexible connecting member 4 in the form of a strap, a thin metal ribbon, or a cable. Alternatively, said ribbon can run through the inside of metal section 1.

Rigid carrying element 1 includes at each end a support foot 5 in which horizontally slide element 1, sheath 2 and therefore connecting element 4; as element 4 is pressed against a boss 6, its direction changes and one end 7 thereof is attached to a caliper 8, the free end 8 being wound on a drum 10 of a tensioning attachment 11.

Caliper 8 and tensioning attachment 11 are both disposed on a tab 12 which slides inside a housing 13 provided in the substantially vertical portion of each foot 5, caliper 8 and tensioning attachment 11 positioning on lug 12 being carried out by fasteners 14 passing through cut-outs 15, thereby allowing various fixing heights.

End 9 of flexible element 4 is inserted into slot 16 of drum 10. Drum rotating causes element 4 to wind and so, in the first place, lugs 12 to substantially upwardly slide, then as soon as flanges 17 of lugs 12 engage the roof lower lateral edge, feet 5 to slide on section 2 of carrying element 1 and, through tensioning of element 4, the whole assembly to be locked on the roof, each foot bearing on the other hand onto roof through non-skid bearing member 18 reinforced by a rigid part 19 or 20 (flat or hollow) which pivots about a horizontal axle 21 passing through foot holes 22.

Said bearing members are featured in having an off-center axle and several bearing faces 7, 18a, 18b, 18c, of different shapes which allow matching different roof configurations.

Off-centering of bearing member axle 23 allows whole assembly height with regard to various roofs to be changed in order to make up with thickness variations thereof.

Tensioning attachment 11 is provided with one or several toothed wheels 24 integral with said drum, which are engaged by a pawl 25 biased by a spring 26.

Pawl 25 acts, on one hand, to prevent tension on connecting element 4 from being released when drum 10 is rotating, and on the other hand, when releasing said drum, to allow lugs 12 to be disengaged from roof, and therefore carrying bar to be removed.

By snapping tensioning attachment 11 onto lug 12, interchangeability of the latter is achieved when such a change is made necessary due to important variations of slope 27 of roof edges which cause similar changes of edge 17 of lug 12, FIG. 2B, in the case of gutter roofs, FIG. 2A.

Cap 28 covers the whole mechanism and can be engaged into hooks 130 and fastened by lock 29.

This invention allows two types of luggage rack to be made, i.e.:

1. One type according to DIN standard, i.e., without any carrying element 1 externally protuding from the feet. In such a case, element 1 is maintained in foot 5 by an element 30, for example a pin, moving along a groove 31 in foot 5 and giving enough clearance to allow said carrying bar to be adapted to different roof widths. Element 30 also ensures plug 32 to be maintained in order to close element 1 end.

2. One carrying bar type including an element 1 which is longer than in type 1 and passes through each foot and protudes from each side; such an increased length of element 1 allows longer articles to be carried and so is favoured by clients.

In such a case, flexible connecting element 4 leaves housing 3 of section 2 through slots 33 disposed so as to allow element 1 end being stopped by a plug 34 and a cap 35 substantially similar to cap 28,except for its upper end which allows element 1 to pass through.

In another embodiment, and as far as type I bars are concerned, caliper 8 on lug 12 can be replaced by another tensioning device of the 11 type but including an additional element for attaching fixed end 7 of flexible connecting element 4, said drum serving to wind the free end of another flexible connecting element which through passing in slot 35 can, by being fixed by its other end provided with an element hooked on element 36 of the opposed foot 5, take part in ensuring carried articles to be safely stowed.

What is claimed is:

1. A carrying bar for installation on a car roof, with or without gutters, including a carrying element having opposite ends, each of which is engaged with a support foot, a flexible member having opposite ends each connected to a said support foot, respectively, a catching element arranged on each support foot for engaging an edge of the roof and a bearing element being disposed adjacent each end of said carrying element for flexibly supporting the carrying element on the car roof, at least one of said support feet being slidably connected with one end of said carrying element, and at least one end of said flexible member being fastened to its respective support foot through tensioning means operable to exert tension on said flexible member to thereby impart a horizontal tension to said support feet to draw said support feet towards each other simultaneously, said tensioning means being located so as to impart additionally a vertical tensioning of said carrying element towards the roof of the vehicle.

2. The carrying bar of claim 1 wherein said carrying bar includes two spaced carrying elements each having a boss for engaging said flexible member.

3. The carrying bar as claimed in claim 1 wherein said carrying element is covered with a sheath made of plastic sections and defining a housing and said flexible member is slidably disposed in said housing.

4. The carrying bar as claimed in claim 1 wherein each catching element is adjustably mounted on a movable plate with said plate being carried in a respective support foot.

5. The carrying bar as claimed in claim 4 wherein each said plate includes catching means in the form of a plurality of cutouts spaced along said plate and for receiving a catching means of an associated catching element.

6. The carrying bar as claimed in claim 4 wherein said carrying element includes a plurality of transverse slots for receiving said flexible member therethrough to engage a boss surface provided on one of said support feet and to permit extended separation of said support feet to accommodate wide loads.

7. The carrying bar as claimed in claim 6 wherein said catching member further includes a tensioning device to impart added tension to said flexible member to assist in holding carried loads.

8. The carrying bar as claimed in claim 2 wherein a cap is provided to cover a said support foot, said cap including locking means.

9. A carrying bar adapted to be installed on a car roof and comprising a carrying element supporting at each of its ends a sliding support foot, said feet being connected by a flexible connecting member to allow clamping of the feet on to a portion of the roof by vertical tightening and simultaneously by horizontal tightening of said flexible connecting member to bring said feet nearer together, said carrying bar further including a bearing element pivotally mounted adjacent a said carrying foot, said bearing element being provided with a plurality of faces of different shape which, upon pivoting of said bearing element, are selectively brought into engagement with a car roof to permit a matching of said bearing element face with a selected roof configuration.

10. The carrying bar as claimed in claim 9 wherein each end of said carrying element is provided with an element cooperating with a groove of each foot thereby allowing said element to substantially slide inside a portion of each said foot to provide said carrying bar without said element externally protruding therefrom (5), said element further being able to insure blocking of a stopping plug (32) and groove (31) allowing said bar to be adjusted according to the car width.

* * * * *